United States Patent [19]
Ryu

[11] Patent Number: 4,540,948
[45] Date of Patent: Sep. 10, 1985

[54] 8-PHASE PHASE-SHIFT KEYING DEMODULATOR

[75] Inventor: Toshihiko Ryu, Tokyo, Japan

[73] Assignee: NEC Corporation, Tokyo, Japan

[21] Appl. No.: 531,787

[22] Filed: Sep. 13, 1983

[30] Foreign Application Priority Data

Sep. 14, 1982 [JP] Japan ................. 57-161420
Dec. 9, 1982 [JP] Japan ................. 57-216524

[51] Int. Cl.³ .............................. H03D 3/02
[52] U.S. Cl. ...................... 329/122; 329/146; 329/50; 329/124
[58] Field of Search ............... 329/50, 122, 124, 137, 329/146; 375/56, 67, 83, 84, 120; 455/304

[56] References Cited

U.S. PATENT DOCUMENTS 4,095,187  6/1978  Yoshida ..................... 329/50
4,338,574  7/1982  Fujita et al. ............. 329/122 X Primary Examiner—Eugene R. LaRoche
Assistant Examiner—Robert J. Pascal
Attorney, Agent, or Firm—Sughrue, Mion, Zinn, Macpeak, and Seas

[57] ABSTRACT

A demodulator features a circuit wherein a signal to effect carrier recovery and elimination of intersymbol interference etc. is produced by digitizing and processing demodulated signals in a manner that in the case of phase deviations due to noise or the like, the deviations fall within zones having predetermined digital identifications enabling the generation of appropriate digital correction signals via which the above mentioned signal production is controlled.

12 Claims, 13 Drawing Figures

8-PHASE PHASE-SHIFT KEYING DEMODULATOR

BACKGROUND OF THE INVENTION

1. Field of the Invention

This invention relates generally to an 8-phase Phase-Shift Keying (8 PSK) demodulator, and more specifically to an improved demodulator featuring carrier recovery, automatic gain control, and intersymbol interference control.

2. Description of the Prior Art

A multi-phase (especially more than eight) PSK system is required to feature stable, accurate carrier recovery and automatic gain control (AGC) along with simultaneous transmission band width minimization which maintains a reasonable quality of the transmitted signals.

An example of a multi-phase PSK demodulator of the Costas loop baseband processing type featuring carrier recovery is disclosed in Japanese Patent Application No. 53-156124. This type of carrier recovery circuit, however, has encountered several problems: complexity, large power consumption, cumbersome circuitry adjustments, and intersymbol interference. The intersymbol interference is caused by variations of transmission channel characteristics and transmission distortion, and is a cause of degradation of signal quality.

Before discussing the preferred embodiments of this invention, reference is first made to FIG. 1 wherein there is shown in block diagram form, the previously mentioned 8 PSK demodulator.

In FIG. 1, an intermediate frequency (IF) signal (i.e., 8-phase phase-modulated signal) is fed to two phase detectors (or demodulators) 2 and 3 via an input terminal 101 and a signal distributor 1. A voltage-controlled oscillator (VCO) 6 applies its output to the phase detectors 2 and 3 by way of a signal distributor 5. A phase shifter 4 is interposed between the signal distributor 5 and the detector 3 and shifts the phase of the signal applied to the detector by $\pi/2$ radians. The IF signal is coherently (or synchronously) detected by the phase detectors 2 and 3, which apply their outputs to binary decision (B.D.) circuits 10 and 13 respectively and further to an adder 8 and a subtractor 9. The adder 8 and the subtractor 9 apply their outputs to binary decision circuits 11 and 12 respectively. Note that the outputs of the adder 8 and the substractor 9 are advanced in phase by $\pi/4$ and $3\pi/4$ compared with the output of the phase detector 2. The binary decision circuits 10, 11, 12, and 13 respectively generate binary outputs which are fed to a code converter 14. The converter 14 produces three-channel data on its three output terminals 102 through 104 in a manner well known in the art.

In order to control the output of VCO 6, the outputs of the phase detector 2, the adder 8, the subtractor 9, and the phase detector 3 are fed to full-wave rectifiers 18, 17, 16, and 15, respectively, and are full-wave rectified by the corresponding circuits. The outputs of the full-wave rectifiers 17 and 18 are added at an adder 20, while the outputs of the full-wave rectifiers 16 and 15 are added at another adder 19. The outputs of the adders 19 and 20 are then applied to a subtractor 21, the output of which is fed to a switch 22. The binary decision circuits 10 through 13 apply their outputs to an Exclusive-OR gate 23 which supplies the switch 22 with a control signal. The switch 22 controls the polarity of the signal from the subtractor 21 in response to the control signal from the Exclusive-OR gate 23. The output of the switch 22 is an automatic phase control (APC) signal which is applied through a low pass filter (LPF) 7 to the VCO 6 for controlling the output thereof. Thus, the carrier is recovered at the VCO 6.

Difficulties are encountered in the circuitry shown in FIG. 1 in that (a) each output of the full-wave rectifiers 15 through 18 is analog processed and (b) the circuit is not provided with an AGC function. More specifically, the analog processing of the outputs of the rectifiers requires careful adjustment of the output amplitudes and the DC (direct current) balances with attendant increase in adjusting work. Further, an AGC circuit should be added to the FIG. 1 arrangement, resulting in a large circuit exhibiting a large power drain. Additionally, the FIG. 1 prior art is not provided with any means for avoiding intersymbol interference and hence is unable to ensure high quality signals.

SUMMARY OF THE INVENTION

It is an object of the present invention to provide an 8 PSK demodulator in which circuit adjustment is minimized.

It is another object of the present invention to provide an 8 PSK demodulator which is simple and which features digital processing.

It is yet another object of the present invention to provide an improved 8 PSK demodulator which although simple in circuitry includes both AGC and APC functions.

It is still another object of the present invention to provide an 8 PSK demodulator which features simple circuit configuration, both AGC and APC functions and which effectively minimizes intersymbol interference.

More specifically, the present invention takes the form of an 8-phase phase-shift keying demodulator for demodulating an 8-phase phase-modulated signal applied thereto; the demodulator comprises: a voltage-controlled oscillator controlled by an automatic phase control signal for carrier recovery; a first phase detector supplied with the phase-modulated signal for coherent detection thereof using the output of the voltage-controlled oscillator; a second phase detector supplied with the phase-modulated signal for coherent detection thereof using the $\pi/2$-radian phase-shifted output of the voltage-controlled oscillator; an adder for adding the outputs of the first and second phase detectors; a subtractor for making subtraction of the outputs of the first and second phase detector; first through fourth binary decision circuits coupled to the first phase detector, the adder, the subtractor, and the second phase detector, respectively, and generating binary signals D1, D2, D3, and D4, respectively; a code converter for receiving the binary signals D1, D2, D3, and D4 and generating code-converted outputs; a first means receiving the outputs of the first and second detector, generating error signals $E_{PL}$ and $E_{PU}$ which are components in the direction of the X coordinate axis on a phase plane and also generating error signals $E_{QU}$ and $E_{QL}$ which are components in the direction of the Y coordinate axis on the phase plane; a second means receiving the signals $E_{PU}$, $E_{PL}$, $E_{QU}$, $E_{QL}$, D2, and D4, and generating error signals $Y_P'$ and $Y_Q'$ according to the signals received; a third means receiving the error signals $Y_P'$ and $Y_Q'$ and generating error signals $Y_P$ and $Y_Q$; and a control signal generator which makes subtraction of the error signals $Y_P$ and $Y_Q$ for producing the automatic phase control signal; in which the signals $Y_P'$, $Y_Q'$, $Y_P$, and $Y_Q$ satisfy the following logic equations, $$Y_P' = E_{PU} \cdot (D2 \oplus D4) + E_{PL} \cdot \overline{(D2 \oplus D4)}$$

$$Y_Q' = E_{QU} \cdot \overline{(D2 \oplus D4)} + E_{QL} \cdot (D2 \oplus D4)$$

$$Y_P = Y_P' \oplus D1 \oplus D3$$

$$Y_Q = Y_Q' \oplus D1 \oplus D3.$$

wherein $\cdot$ and $\oplus$ denote AND and EXCLUSIVE-OR operations respectively.

BRIEF DESCRIPTION OF THE DRAWINGS

The features and advantages of the present invention will become more clearly appreciated from the following description taken in conjunction with the accompanying drawings in which like blocks or circuit elements are denoted by like reference numerals and in which.

DETAILED DESCRIPTION OF THE PREFERRED EMBODIMENTS

Figure 1:
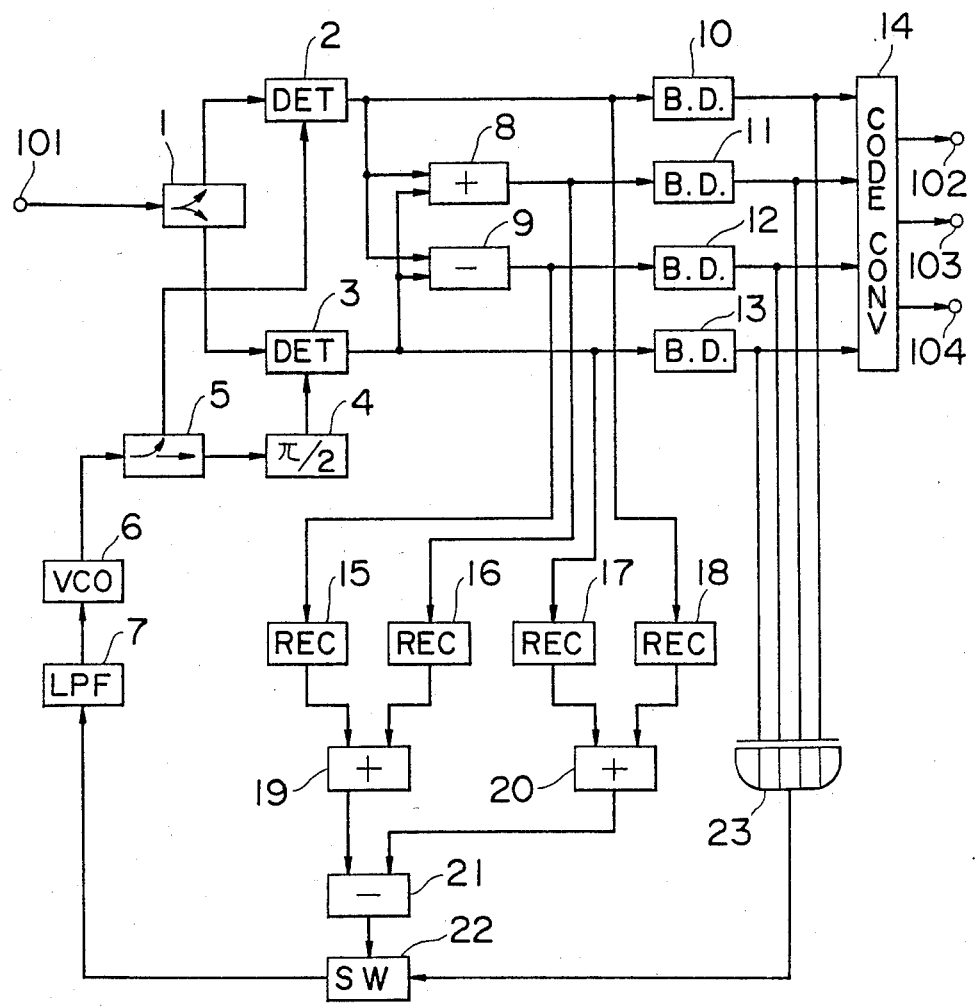
FIG. 1 is a block diagram showing the prior art 8 PSK demodulator discussed previously.
Figure 2:
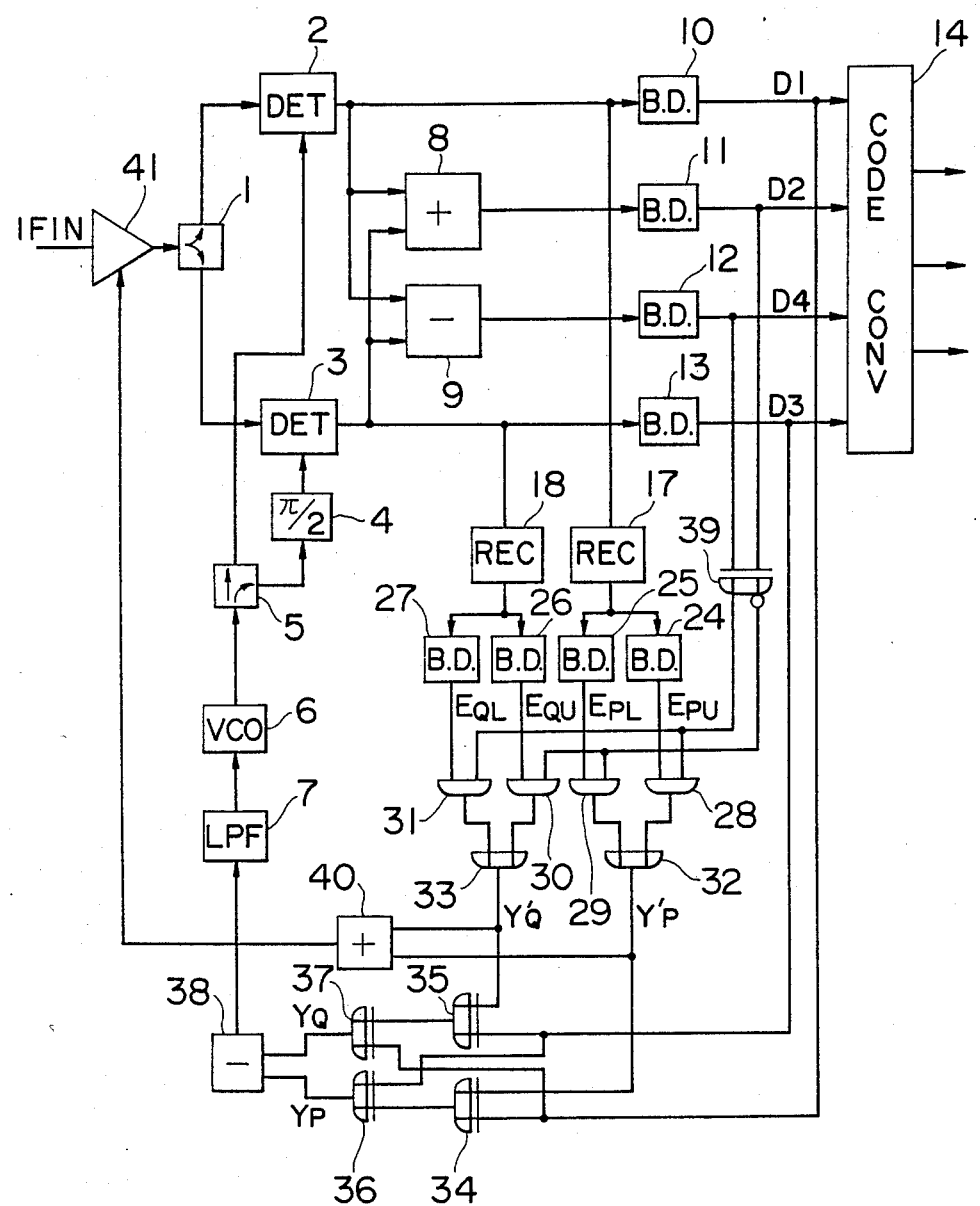
FIG. 2 is a block diagram showing a first embodiment of an 8 PSK demodulator according to this invention.

Turning now to FIG. 2, there is shown in block diagram form an arrangement of the first embodiment of this invention which includes: signal distributors 1 and 5, phase detectors 2 and 3, a $\pi/2$ phase shifter 4, a VCO 6, a low pass filter (LPF) 7, an adder 8, a subtractor 9, binary decision circuits 10 through 13, and a code converter 14, and full-wave rectifiers 17 and 18, all of which correspond to the blocks denoted by the same reference numerals as used in FIG. 1. The FIG. 2 arrangement further comprises binary decision circuits 24 through 27, AND gates 28 through 31, OR gates 32 and 33, Exclusive-OR gates 34 through 37, a subtractor 38, another Exclusive-OR gate 39, an adder 40, and an AGC circuit 41, all of which are coupled as shown.

In operation, an IF signal (i.e. 8-phase phase-modulated signal) is applied to the AGC circuit 41 the gain of which is controlled by an AGC signal, that is, the output of the adder 40. The output of the AGC circuit 41 is then fed to the phase detectors 2 and 3 via the signal distributor 1. The VCO 6 applies its output to the phase detectors 2 and 3 by way of the signal distributor 5. A phase shifter 4 is interposed between the signal distributor 5 and the detector 3 and shifts the phase of the signal applied to the detector by $\pi/2$ radians. The IF signal from the AGC circuit 41 is coherently (or synchronously) detected by the phase detectors 2 and 3, which apply their outputs to the binary decision (B.D.) circuits 10 and 13 respectively and to the adder 8 and the subtractor 9. The adder 8 and the subtractor 9 apply their outputs to the binary decision circuits 11 and 12 respectively. Note that the outputs of the adder 8 and the substractor 9 are advanced in phase by $\pi/4$ and $3\pi/4$ compared with the output of the phase detector 2. The binary decision circuits 10, 11, 12, and 13 respectively generate binary outputs D1, D2, D4, and D3, which are fed to the code converter 14. The converter 14 produces three-channel data on its three output terminals 102 through 104 in a manner well known in the art. The circuit operation thus far described is the same as discussed previously with reference to FIG. 1.

Figure 3:
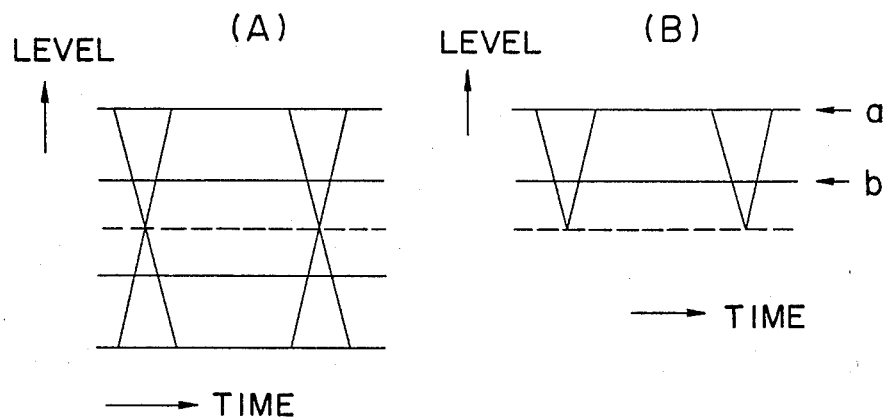
FIG. 3(A) is a waveform of a demodulated signal before full-wave rectification.
FIG. 3(B) is a waveform of a demodulated signal after full-wave rectification.

The phase detectors 2 and 3 also apply their outputs to the full-wave rectifiers 17 and 18 respectively. The output of the phase detector 2 (or 3) (i.e. the modulated signal) has four different values and has a waveform as shown in FIG. 3A. The full-wave rectifier 17 applies its output to the binary decision circuits 24 and 25, while the rectifier 18 applies its output to the binary decision circuits 26 and 27. The binary decision circuits 24 through 27 produce error signals $E_{PU}$, $E_{PL}$, $E_{QU}$, and $E_{QL}$, respectively. The waveform of the output of the full-wave rectifier 17 (or 18) is shown in FIG. 3B, in which "a" represents a threshold level of $E_{PU}$ and $E_{QU}$ and "b" a threshold level of $E_{PL}$ and $E_{QL}$. The error signals $E_{PL}$ and $E_{PU}$ are components in the direction of the X coordinate axis of a phase plane, while the error signals $E_{QU}$ and $E_{QL}$ are components in the direction of the Y coordinate axis of said phase plane.

The binary outputs D2 and D4 are fed to the Exclusive-OR gate 39, which in turn applies the non-inverted outputs to the AND gates 28, 31, and applies the inverted outputs to the AND gates 29 and 30. The AND gates 28 through 31 each performs an AND operation with two of the binary outputs of the circuits 24–27 and 39, as shown. The outputs of the AND gates 28 and 29 are ORed at the OR gate 32, while the outputs of the AND gates 30 and 31 are ORed at the OR gate 33. The OR gates 32 and 33 produce error signals $Y_P'$ and $Y_Q'$ respectively which are then fed to the adder 40. The adder 40 adds the error signals $Y_P'$ and $Y_Q'$ and generates the AGC signal which is applied to the AGC circuit 41 for controlling the gain thereof, as described previously.

The error signals $Y_P'$ and $Y_Q'$ are represented by the following logic equations:

$$Y_P' = E_{PU} \cdot (D2 \oplus D4) + E_{PL} \cdot \overline{(D2 \oplus D4)} \tag{1}$$

$$Y_Q' = E_{QU} \cdot \overline{(D2 + \oplus D4)} + E_{QL} \cdot (D2 \oplus D4) \tag{2}$$

The error signal $Y_P'$ is also fed to one input terminal of the Exclusive-OR gate 34 which receives the signal D1 at the other input terminal. The Exclusive-OR gate 36 is arranged to receive the output of the gate 34 as well as the signal D3 and to generate an error signal $Y_P$. The error signal $Y_Q'$ is applied to one input terminal of the Exclusive-OR gate 35 which receives the signal D3 at the other input terminal. The Exclusive-OR gate 37 receives the output of the gate 35 as well as the signal D1, and generates an error signal $Y_Q$. The signals $Y_P$ and $Y_Q$ are fed to the subtractor 38 which outputs an automatic phase control (APC) signal. The APC signal is applied to the VCO 6 via the LPF 7 and thus controls VCO 6 for recovering the carrier wave.

The error signals $Y_P$ and $Y_Q$ are represented by the following logic equations:

$$Y_P = Y_P' \oplus D1 \oplus D3 \quad (3)$$

$$Y_Q = Y_Q' \oplus D1 \oplus D3 \quad (4)$$

Figure 4:
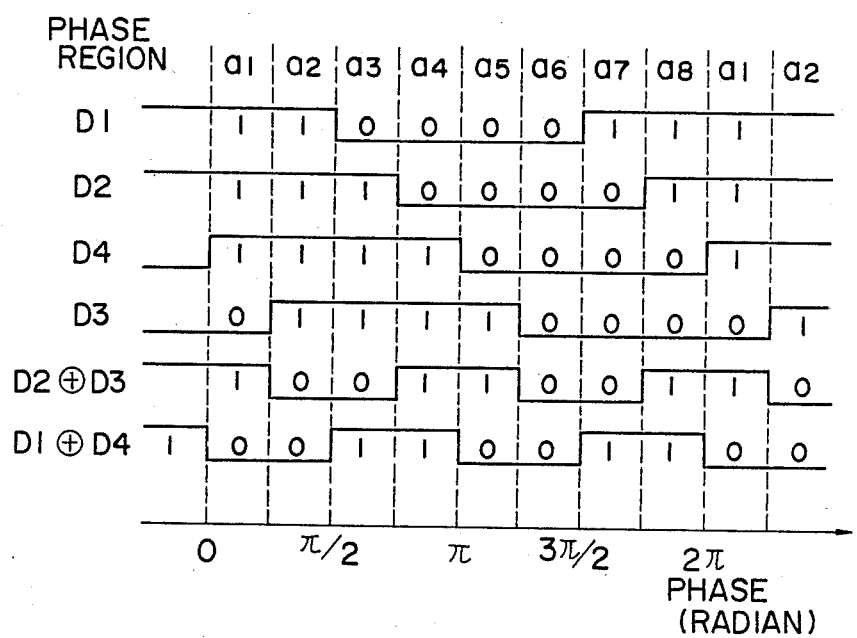
FIG. 4 is a table showing waveforms of binary signals in different phase regions which are produced in the first embodiment.
Figure 5:
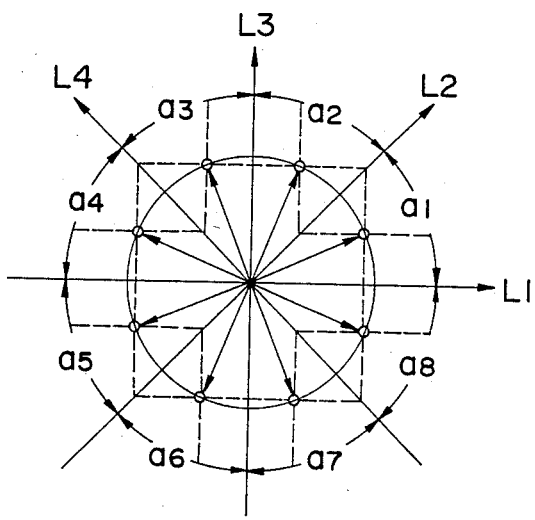
FIG. 5 is a phase diagram for describing the operations of the first embodiment.

FIG. 4 shows waveforms of the signals D1, D2, D3, D4, D2⊕D4, and D1⊕D3 in each phase region of a1–a8 which are defined by four phases L1–L4 of the carrier wave as shown in FIG. 5. Note that the signals D1, D2, D3, and D4 are respectively equivalent to the signals which are coherently detected by the carrier wave having the phases L1, L2, L3, and L4 respectively.

As shown in FIG. 5, each phase sector of a1–a8 is further divided into four sub-phase regions by two orthogonal broken lines, which are parallel to the lines of phases L1 and L3 respectively and which are drawn so as to involve normal lock points marked by "o".

Figure 6:
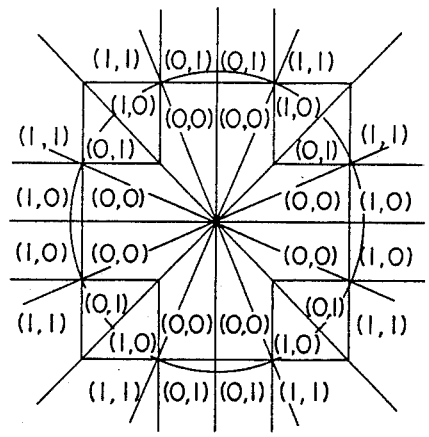
FIGS. 6 and 7 each is a phase diagram showing the components of error signals allocated in divided phase regions.
Figure 7:
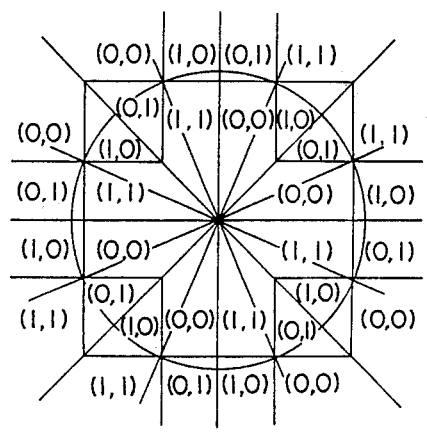

The principle of the first embodiment of this invention is to generate the error signals $Y_P'$, $Y_Q'$, $Y_P$, and $Y_Q$ in the directions of the phases L1 and L3 (i.e. X- and Y-axis direction respectively) in order to obtain the AGC and APC signals. More specifically, FIG. 6 shows the components of ($Y_P'$, $Y_Q'$) allocated to the aforementioned sub-phase regions shown in FIG. 5, wherein the error signal components of (1,1) and (0,0) can be used to produce the AGC signal while the other components of (1,0) and (0,1) are not available for producing the AGC signal in that the addition thereof at the adder 40 results in no difference therebetween. FIG. 7 shows the components of ($Y_P$, $Y_Q$) allocated to the sub-phase regions shown in FIG. 5, wherein the error signal components of (1,0) and (0,1) are available for producing the APC signal while the other components of (0,0) and (1,1) are not available for producing the APC signal because the subtraction thereof at the subtractor 38 results in no difference therebetween.

The carrier recovery according to this invention will become more apparent from further discussion with reference to FIG. 7, in which phase points (each marked "X") are shifted or deviated from the normal lock points. These phase deviations appear in the sub-regions of the error signal component (1,0). Conversely, if the phase deviations occur on the opposite side of the lock points, then the deviated points each fall in the sub-phase regions of (0,1). As a result, the subtraction of ($Y_P - Y_Q$) at the subtractor 38 generates an appropriate APC signal and hence ensures the carrier recovery.

The demodulated baseband signal in the 8 PSK demodulator assumes four different values. The two demodulated signals which are respectively coherently detected by the carrier having phases L1 and L3, have a predetermined correlation therebetween that if the four values of each signal are classified into two groups; inside (small level) and outside (large level), then the two signals assume different levels with respect to each other. This is a noticeable difference of 8 PSK from 16 QAM (quadrature amplitude modulation). By way of example, If D2⊕D4=1, then $Y_P = E_{PU}$ and $Y_Q = E_{QL}$ from the equations (1)-(4) wherein $Y_P = E_{PU}$ indicates the detection of the large level and $Y_Q = E_{QL}$ indicates the detection of the small level.

Figure 8:
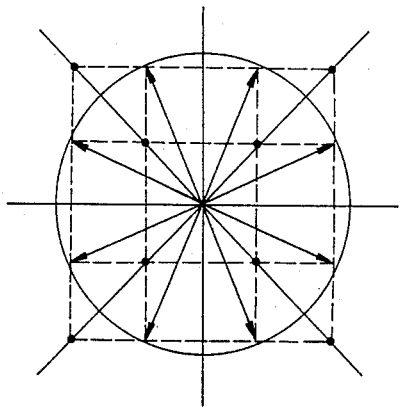
FIG. 8 is a phase diagram showing false lock points and vectors directing normal lock points.

The 8 PSK demodulator of this invention is not affected by false lock points denoted by the bold black points as shown in FIG. 8. In other words, this invention allows stable carrier recovery through the normal lock points. In FIG. 8, the arrows each denotes a vector on which normal lock points are located.

Figure 9:
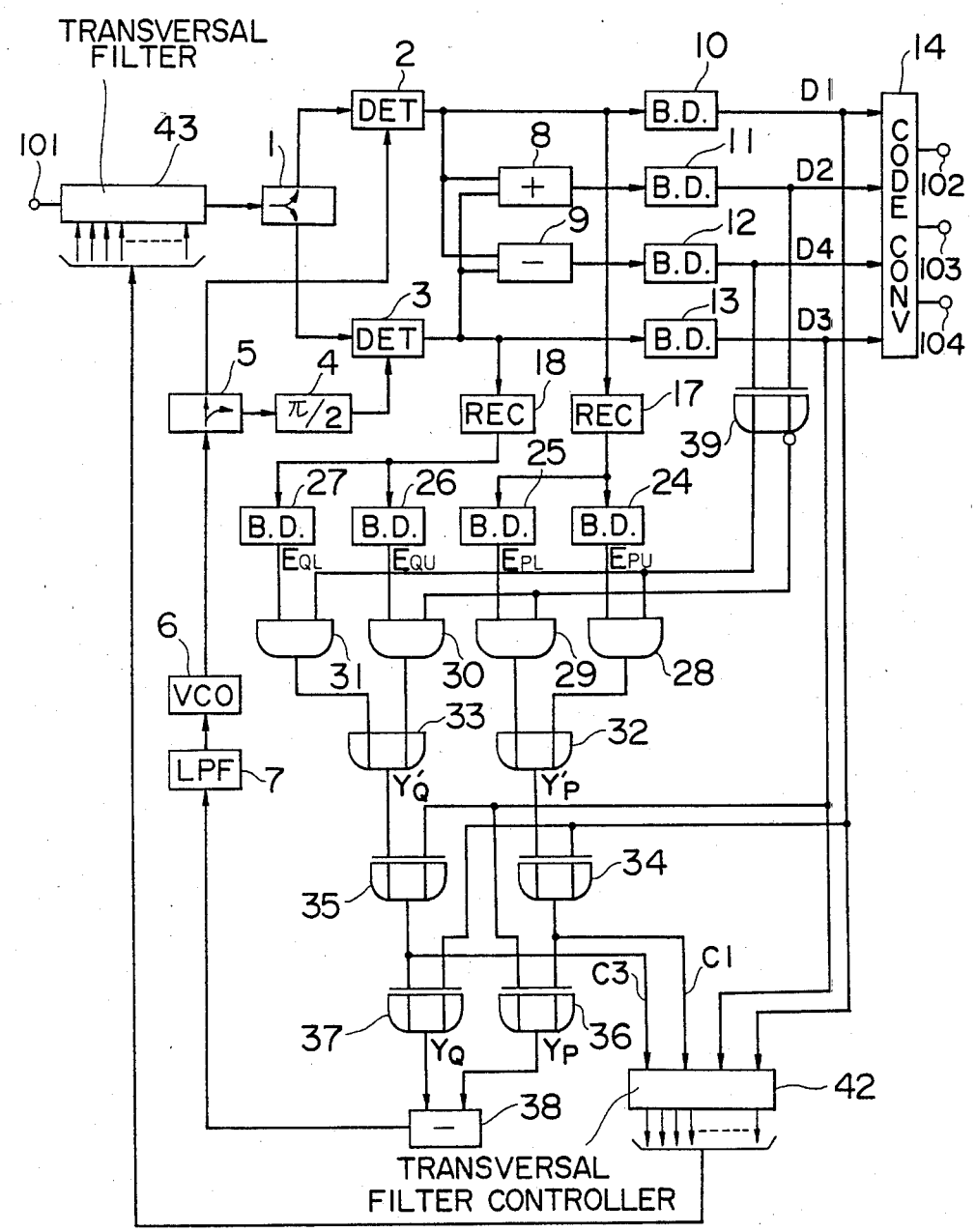
FIG. 9 is a block diagram showing a second embodiment of this invention.

Reference is now made to FIG. 9, wherein a second preferred embodiment of this invention is shown in block diagram form. The second embodiment is the same circuit configuration as the first embodiment with the exception of the inclusion of an adaptive transversal equalizer (consisting of a control signal generator 42 and a transversal filter 43) in place of the AGC circuit 41 and the adder 40. The provision of the adaptive transversal equalizer is to prevent the degradation of signal quality by eliminating intersymbol interference, which is caused by the variations of channel transmission characteristics as well as transmission distortion. Note that the second embodiment shares the same features as the first embodiment, that is, AGC and APC.

The operation of the FIG. 10 arrangement will be described hereinafter. An IF signal is fed to the transversal filter 43 which includes a tapped delay line although not shown. The output of each tap is weighted by a variable gain factor in response to control signals from the control signal generator 42, and the weighted outputs are added and sampled to form the output. The transversal filter 43 compensates for the intersymbol interference as well as the signal level of the IF input, and applies its output to the phase detectors 2 and 3 via the signal distributor 1.

The control signal generator 42 is arranged to receive error signals C1 and C3 from the Exclusive-OR gates 34 and 35, and also receives the outputs D1 and D3 of the binary decision circuits 10 and 13 respectively. The error signals C1 and C3 bear information of the signal level variations due to the IF input itself as well as the intersymbol interference. The generator 42 determines correlations between the simultaneously produced error signals and the demodulated signal, and outputs the control signal which is applied to the transversal filter 43 for controlling the variable gain factors thereof. The adaptive transversal equalizer of FIG. 9 may take the form of the arrangement disclosed in the European Patent application publication No. 0055922, for example. The APC function etc., of the FIG. 9 arrangement is the same as those described in connection with the FIG. 2 arrangement, so that no further description will be made.

Figure 11:
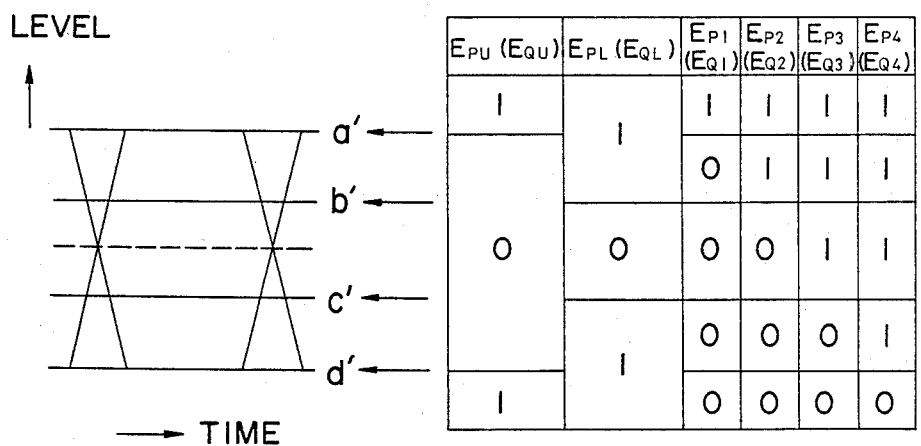
FIG. 11 is a waveform of a demodulated signal and a truth table of binary signals for explaining the operations of the third embodiment.
Figure 10:
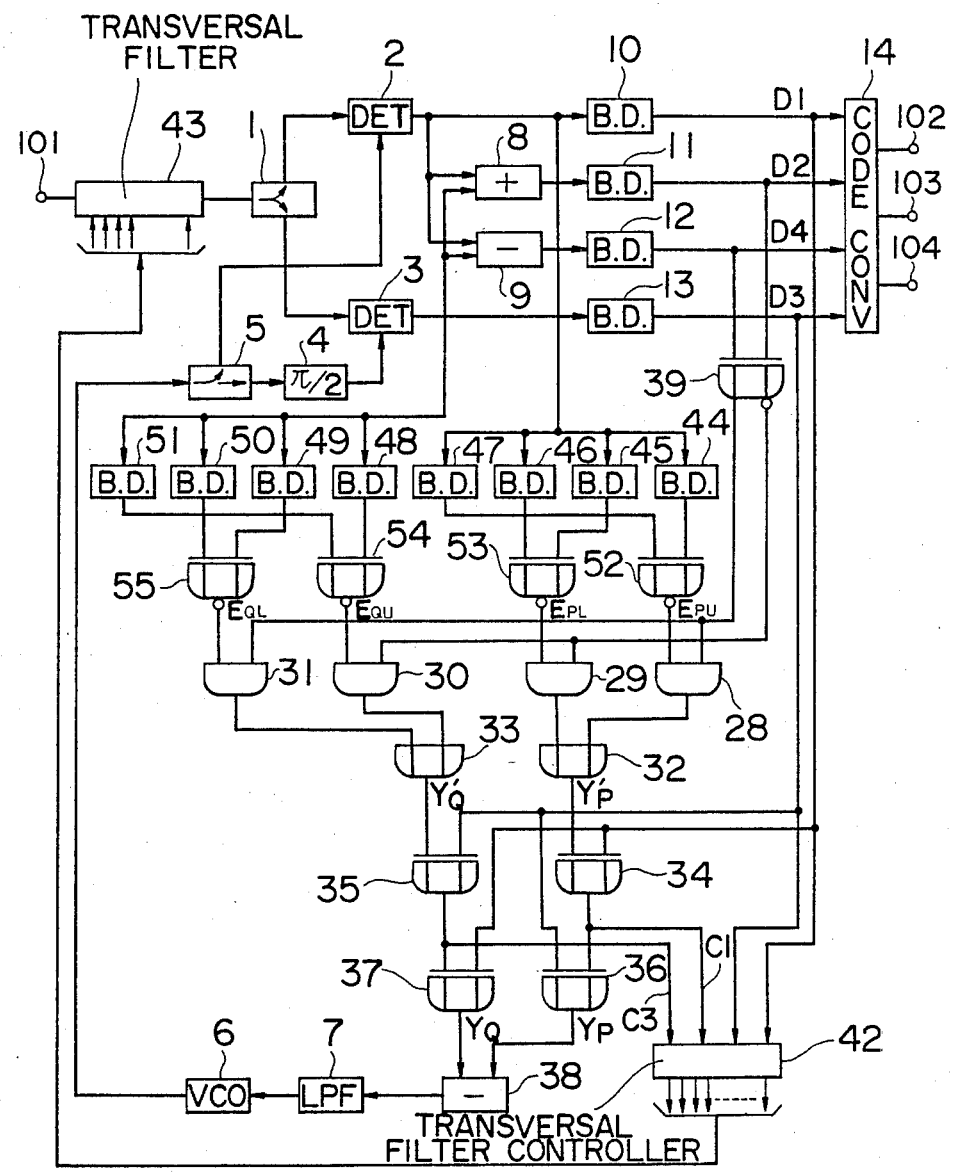
FIG. 10 is a block diagram showing a third embodiment of this invention.
Figure 12:
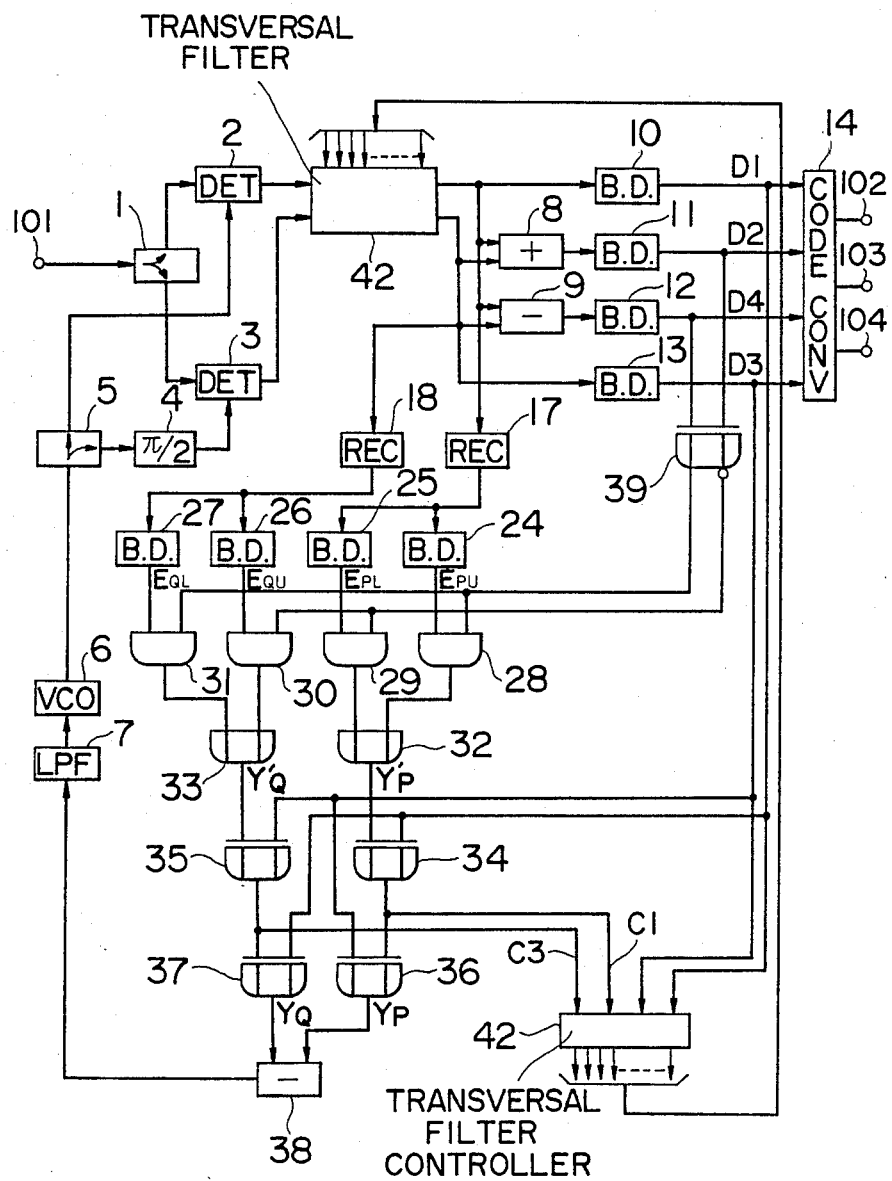
FIG. 12 is a block diagram showing a fourth embodiment of this invention.

FIG. 10 shows in block diagram form a third embodiment of this invention. The circuit configuration of this embodiment is identical with the second embodiment shown in FIG. 9 except that the full-wave rectifiers 17-18 and binary decision circuits 24-27 of the second embodiment are replaced by binary decision circuits 44-51 and Exclusive-OR gates 52-55. The other arrangement of FIG. 12 is the same as that of FIG. 10, so that only the modified portion will be discussed. In FIG. 10, the output of the phase detector 2 is applied to the binary decision circuits 44-47 which generate error signals $E_{P1}$-$E_{P4}$. The error signals $E_{P1}$ and $E_{P4}$ are fed to the Exclusive-OR gate 52 which generates the error signal $E_{PU}$, while the error signals $E_{P2}$ and $E_{P3}$ are applied to the Exclusive-OR gate 53 which outputs another error signal $E_{PL}$. On the other hand, the phase detector 3 applies its output to the binary decision circuits 48–51 which generate error signals $E_{Q1}$–$E_{Q4}$. The Exclusive-OR gate 54 receives the error signals $E_{Q1}$ and $E_{Q4}$ and generates the error signal $E_{QU}$. The Exclusive-OR gate 55 is supplied with the error signals $E_{Q2}$ and $E_{Q3}$ and outputs the error signal $E_{QL}$. FIG. 11 illustrates correlations between the error signals $E_{P1}$–$E_{P4}$, $E_{Q1}$–$E_{Q4}$, $E_{PU}$, $E_{PL}$, $E_{QU}$, and $E_{QL}$, together with four reference values a', b', c', and d' for said error signals $E_{PU}$, $E_{PL}$, $E_{QU}$, and $E_{QL}$.

FIG. 12 is a block diagram showing a fourth embodiment of this invention, wherein the transversal filter 43 is provided after the phase detectors 2 and 3. The other arrangement of FIG. 12 is identical to that of FIG. 11. The transversal filter 43 is arranged to process the baseband signal, however operates in the same manner as that of FIG. 9 or 10. Therefore the detailed discussion will be omitted.

The first and fourth embodiments each can be modified into yet another arrangement wherein the full-wave rectifiers 17–18 and the binary decision circuits 24–27 are replaced by the binary decision circuits 44–51 and the Exclusive-OR gates 52–55. Note that there exist the advantages of this invention as described previously also in this modification.

As can be understood from the foregoing, the 8 PSK demodulator according to this invention is able to effectively improve the characteristics of AGC and APC, and also effectively eliminates the intersymbol interference through the use of adaptive transversal equalizer.

The foregoing description shows only preferred embodiments of the present invention. Various modifications are apparent to those skilled in the art without departing from the scope of the present invention which is only limited by the appended claims.

What is claimed is:

1. An 8-phase phase-shift keying demodulator for demodulating an 8-phase phase-modulated signal applied thereto, said demodulator including:

a voltage-controlled oscillator (6) controlled by an automatic phase control signal for carrier recovery;

a first phase detector (2) supplied with said phase-modulated signal for coherent detection thereof using the output of said voltage-controlled oscillator;

a second phase detector (3) supplied with said phase-modulated signal for coherent detection thereof using the $\pi/2$-radian phase-shifted output of said voltage-controlled oscillator;

an adder (8) for adding the outputs of said first and second phase detector;

a subtractor (9) for making subtraction of the outputs of said first and second phase detector;

first through fourth binary decision circuits (10), (11), (12), and (13) coupled to said first phase detector, said adder, said subtractor, and said second phase detector, respectively, and generating binary signals D1, D2, D3, and D4, respectively;

a code converter (14) for receiving said binary signals D1, D2, D3, and D4 and generating code-converted outputs, wherein the improvement comprises:

a first means receiving the outputs of said first and second detector, generating error signals $E_{PL}$ and $E_{PU}$ which are components in the direction of the X coordinate axis on a phase plane and also generating error signals $E_{QU}$ and $E_{QL}$ which are components in the direction of the Y coordinate axis on said phase plane;

a second means receiving the signals $E_{PU}$, $E_{PL}$, $E_{QU}$, $E_{QL}$, D2, and D4, and generating error signals $Y_P'$ and $Y_Q'$ according to the signals received;

a third means receiving said error signals $Y_P'$, $Y_Q'$, D1 and D3 and generating error signals $Y_P$ and $Y_Q$; and a control signal generator which makes subtraction of said error signals $Y_P$ and $Y_Q$ for producing said automatic phase control signal; in which the signals $Y_P'$, $Y_Q'$, $Y_P$, and $Y_Q$ satisfy the following logic equations, $Y_P' = E_{PU} \cdot (D2 \oplus D4) + E_{PL} \cdot \overline{(D2 \oplus D4)}$ $Y_Q' = E_{QU} \cdot \overline{(D2 \oplus D4)} + E_{QL} \cdot (D2 \oplus D4)$ $Y_P = Y_P' \oplus D1 \oplus D3$ $Y_Q = Y_Q' \oplus D1 \oplus D3$.

2. The demodulator as claimed in claim 1, wherein said first means includes: a first full-wave rectifier (17) coupled to said first phase detector; a second full-wave rectifier (18) coupled to said second phase detector; two binary decision circuits (24)–(25) each having an input coupled to the output of said first full-wave rectifier; two binary decision circuits (26)–(27) each having an input coupled to the output of said second full-wave rectifier.

3. The demodulator as claimed in claim 1, wherein said first means includes: a first group of four binary decision circuits (44)–(47) each having an input coupled to the output of said first phase detector; a first Exclusive-OR gate (52) receiving the outputs of two binary decision circuits of said first group for generating said error signal $E_{PU}$; a second Exclusive-OR gate (53) receiving the outputs of the other two binary decision circuits of said first group for generating said error signal $E_{PL}$; a second group of four binary decision circuits (48)–(51) each having an input coupled to the output of said second phase detector; a third Exclusive-OR gate (54) receiving the outputs of two binary decision circuits of said second group for generating said error signal $E_{QU}$; a fourth Exclusive-OR gate (55) receiving the outputs of the other two binary decision circuits of said second group for generating said error signal $E_{QL}$.

4. The demodulator as claimed in claim 1 further comprising, an automatic gain control circuit (41) so arranged that said first and said second phase detector are preceded thereby, and an adder (40) for adding said error signals $Y_P'$ and $Y_Q'$ and for producing a gain control signal which is applied to said automatic gain control circuit.

5. The demodulator as claimed in claim 4, wherein said first means includes: a first full-wave rectifier (17) coupled to said first phase detector; a second full-wave rectifier (18) coupled to said second phase detector; two binary decision circuits (24)–(25) each having an input coupled to the output of said first full-wave rectifier; two binary decision circuits (26)–(27) each having an input coupled to the output of said second full-wave rectifier.

6. The demodulator as claimed in claim 4, wherein said first means includes: a first group of four binary decision circuits (44)–(47) each having an input coupled to the output of said first phase detector; a first Exclusive-OR gate (52) receiving the outputs of two binary decision circuits of said first group for generating said error signal $E_{PU}$; a second Exclusive-OR gate (53) receiving the outputs of the other two binary decision circuits of said first group for generating said error signal $E_{PL}$; a second group of four binary decision circuits (48)–(51) each having an input coupled to the output of said second phase detector; a third Exclusive-OR gate (54) receiving the outputs of two binary decision circuits of said second group for generating said error signal $E_{QU}$; a fourth Exclusive-OR gate (55) receiving the outputs of the other two binary decision circuits of said second group for generating said error signal $E_{QL}$.

7. The demodulator as claimed in claim 1 wherein said third means comprises: a first Exclusive-OR gate (34) receiving the signals $Y_{P}'$ and D1 for outputting an error signal C1; a second Exclusive-OR gate (35) receiving the signals $Y_{Q}'$ and D3 for outputting an error signal C3; a third Exclusive-OR gate (36) receiving the output of said first Exclusive-OR gate and the signal D3 for outputting said error signal $Y_{P}$; and a fourth Exclusive-OR gate (37) receiving the output of said second Exclusive-OR gate and the signal D1 for outputting said error signal $Y_{Q}$, and wherein said demodulator further comprises: a transversal filter controller (42) which receives the signals D1 and D3 as well as the outputs of said first and second Exclusive-OR gate and which generates a transversal filter control signal; and a transversal filter (43) which is so arranged that said first and second phase detector are preceded thereby and to which said transversal control signal is applied.

8. The demodulator as claimed in claim 7, wherein said first means includes: a first full-wave rectifier (17) coupled to said first phase detector; a second full-wave rectifier (18) coupled to said second phase detector; two binary decision circuits (24)–(25) each having an input coupled to the output of said first full-wave rectifier; two binary decision circuits (26)–(27) each having an input coupled to the output of said second full-wave rectifier.

9. The demodulator as claimed in claim 7, wherein said first means includes: a first group of four binary decision circuits (44)–(47) each having an input coupled to the output of said first phase detector; a first Exclusive-OR gate (52) receiving the outputs of two binary decision circuits of said first group for generating said error signal $E_{PU}$; a second Exclusive-OR gate (53) receiving the outputs of the other two binary decision circuits of said first group for generating said error signal $E_{PL}$; a second group of four binary decision circuits (48)–(51) each having an input coupled to the output of said second phase detector; a third Exclusive-OR gate (54) receiving the outputs of two binary decision circuits of said second group for generating said error signal $E_{QU}$; a fourth Exclusive-OR gate (55) receiving the outputs of the other two binary decision circuits of said second group for generating said error signal $E_{QL}$.

10. The demodulator as claimed in claim 1 wherein said third means comprises: a first Exclusive-OR gate (34) receiving the signals $Y_{P}'$ and D1 for outputting an error signal C1; a second Exclusive-OR gate (35) receiving the signals $Y_{Q}'$ and D3 for outputting an error signal C3; a third Exclusive-OR gate (36) receiving the output of said first Exclusive-OR gate and the signal D3 for outputting said error signal $Y_{P}$; and a fourth Exclusive-OR gate (37) receiving the output of said second Exclusive-OR gate and the signal D1 for outputting said error signal $Y_{Q}$, and wherein said demodulator further comprises: a transversal filter controller (42) which receives the signals D1 and D3 as well as the outputs of said first and second Exclusive-OR gate and which generates a transversal filter control signal; and a transversal filter (43) which is so arranged that said first and second phase detector precede and to which said transversal control signal is applied.

11. The demodulator as claimed in claim 10, wherein said first means includes: a first full-wave rectifier (17) coupled to said first phase detector; a second full-wave rectifier (18) coupled to said second phase detector; two binary decision circuits (24)–(25) each having an input coupled to the output of said first full-wave rectifier; two binary decision circuits (26)–(27) each having an input coupled to the output of said second full-wave rectifier.

12. The demodulator as claimed in claim 10, wherein said first means includes: a first group of four binary decision circuits (44)–(47) each having an input coupled to the output of said first phase detector; a first Exclusive-OR gate (52) receiving the outputs of two binary decision circuits of said first group for generating said error signal $E_{PU}$; a second Exclusive-OR gate (53) receiving the outputs of the other two binary decision circuits of said first group for generating said error signal $E_{PL}$; a second group of four binary decision circuits (48)–(51) each having an input coupled to the output of said second phase detector; a third Exclusive-OR gate (54) receiving the outputs of two binary decision circuits of said second group for generating said error signal $E_{QU}$; a fourth Exclusive-OR gate (55) receiving the outputs of the other two binary decision circuits of said second group for generating said error signal $E_{QL}$.

* * * * *